(12) United States Patent
Stewart et al.

(10) Patent No.: US 7,397,905 B1
(45) Date of Patent: Jul. 8, 2008

(54) INTERACTIVE VOICE RESPONSE (IVR) SYSTEM PROVIDING DYNAMIC RESOLUTION OF DATA

(75) Inventors: Daniel W. Stewart, San Jose, CA (US); Kassandra B. Guy, Simi Valley, CA (US)

(73) Assignee: Edify Corporation, Santa Clara, CA (US)

( * ) Notice: Subject to any disclaimer, the term of this patent is extended or adjusted under 35 U.S.C. 154(b) by 141 days.

(21) Appl. No.: 11/060,899

(22) Filed: Feb. 18, 2005

Related U.S. Application Data

(60) Provisional application No. 60/601,222, filed on Aug. 13, 2004.

(51) Int. Cl.
  *H04M 1/64* (2006.01)
(52) U.S. Cl. .......... 379/88.01; 379/88.06; 455/420; 700/94; 703/20; 703/21; 703/22; 707/104.1; 709/202; 715/727
(58) Field of Classification Search ... 379/88.01–88.07; 455/418–420; 700/94; 703/20–22; 707/104.1; 709/202; 715/700, 727
  See application file for complete search history.

(56) References Cited

U.S. PATENT DOCUMENTS

| | | | | |
|---|---|---|---|---|
| 5,243,643 A | * | 9/1993 | Sattar et al. | 379/88.23 |
| 5,576,965 A | * | 11/1996 | Akasaka et al. | 700/97 |
| 5,632,035 A | * | 5/1997 | Goodwin | 717/126 |
| 5,677,997 A | * | 10/1997 | Talatik | 706/45 |
| 6,058,181 A | * | 5/2000 | Hebert | 379/242 |
| 6,078,325 A | | 6/2000 | Jolissaint et al. | |
| 6,161,147 A | * | 12/2000 | Snyder et al. | 719/310 |
| 6,173,266 B1 | * | 1/2001 | Marx et al. | 704/270 |
| 6,173,437 B1 | * | 1/2001 | Polcyn | 717/100 |
| 6,311,164 B1 | * | 10/2001 | Ogden | 705/7 |
| 6,314,402 B1 | * | 11/2001 | Monaco et al. | 704/275 |
| 6,321,198 B1 | | 11/2001 | Hank et al. | |
| 6,560,576 B1 | * | 5/2003 | Cohen et al. | 704/270 |
| 6,647,111 B1 | * | 11/2003 | Bjornberg et al. | 379/220.01 |
| 6,898,199 B1 | * | 5/2005 | Silva et al. | 370/352 |
| 7,143,042 B1 | * | 11/2006 | Sinai et al. | 704/270.1 |
| 2002/0076008 A1 | * | 6/2002 | Neary | 379/88.01 |
| 2003/0212561 A1 | * | 11/2003 | Williams et al. | 704/270.1 |

* cited by examiner

*Primary Examiner*—Fan Tsang
*Assistant Examiner*—Hemant Patel
(74) *Attorney, Agent, or Firm*—Fulbright & Jaworski LLP

(57) ABSTRACT

An interactive voice response (IVR) system executes a call flow that references data objects holding information. The information within a data object includes a variable that holds a value utilized by the call flow, state information describing the state of the variable, and fulfillment type information that describes how to get a value for the variable or otherwise change the variable's state. Process and application objects in the call flow specify desired states of variables at given points in the call flow. A resolution module within the IVR system determines whether the variables are in the desired states and, if not, utilizes the fulfillment type information in the data objects to attempt to put the variables in the desired states. This dynamic resolution process provides a mechanism for resolving the values of variables in data objects as the values are required and eases the burden on the call flow developer.

24 Claims, 4 Drawing Sheets

INTERACTIVE VOICE RESPONSE (IVR) SYSTEM PROVIDING DYNAMIC RESOLUTION OF DATA

CROSS-REFERENCE TO RELATED APPLICATION

This application claims the benefit of U.S. Provisional Application No. 60/601,222, filed Aug. 13, 2004, which is hereby incorporated by reference herein.

BACKGROUND OF THE INVENTION

1. Field of the Invention

The present invention relates to software tools for developing and executing interactive voice response (IVR) applications. More particularly, the present invention relates to software tools for developing and executing IVR applications that include data-dependent call flows.

2. Description of Background Art

Interactive voice response (IVR) systems enable a dialogue between a human caller (e.g., using a telephone) and a computer system so that the caller can direct the computer system to perform a task. People can use IVR systems to perform a variety of tasks, from selecting one of several menu options to performing financial transactions.

An IVR system usually comprises standard computer hardware and a speech-enabled (IVR) application. An IVR application, such as a telephone banking application, defines a call flow that controls the operation of the IVR system during a call. A call flow includes one or more steps. A step can be, for example, playing sounds to the caller, obtaining information from the caller, or performing an application-specific task.

A call flow frequently includes one or more variables. The value of a variable can affect the call flow, thereby affecting the operation of the IVR system. For example, the value can determine what sounds are played to the caller, whether a caller should be transferred, and to which number a caller should be transferred. Sometimes, when an IVR system begins operation (e.g., in response to an incoming phone call), a variable's value has not yet been specified. The value is specified during operation (e.g., during the phone call) and can be determined by, for example, caller input that has been recognized by a speech recognition engine. Since caller input affects the value and the value affects the operation of the IVR system, caller input affects the operation of the IVR system.

Initially, IVR applications were generally custom-designed for each customer. As a result, the design process was time-consuming and labor-intensive, and the applications required substantial pre-release testing. Recently, frameworks have been created for developing IVR applications, thus enabling less experienced people to create new IVR applications and modify existing ones. These frameworks generally include reusable software components that are represented by icons in a graphical display. The call flow of an application can be specified by connecting these icons, and the process steps represented by the icons can be modified by associating parameters with the underlying components.

Now that it is easier to create new IVR applications, it is also easier to create "broken" ones. Similarly, now that it is easier to modify existing applications, it is also easier to "break" existing ones. If the value of a particular variable affects a call flow, it follows that the value must be determined at some point during the operation of the IVR system. Usually, a call flow will include a component that determines the value of the variable (e.g., by obtaining information from a caller). Later on in the call flow, after the value has been obtained, it can be used by other components. One way to "break" an IVR application is by moving one of these "variable-reliant" components earlier in the call flow than the component that determines the value of the variable.

What is needed is an IVR system that can handle a call flow where a "variable-reliant" component precedes the determination of the value of that variable.

SUMMARY OF THE INVENTION

The above need is met by an IVR system that performs dynamic resolution of variables in the call flow. The call flow references data objects holding information. The information within a data object includes a variable that holds a value utilized by the call flow, state information describing the state of the variable, and fulfillment type information that describes how to get a value for the variable or otherwise change the variable's state. The information within the data object can also include how to vocalize the data object's value, what value(s), if any, the data object should have as an initial value, and which other data objects, if any, should have their status reset when the data object has its value set. Process and application objects in the call flow specify desired states of variables at given points in the call flow. A resolution module within the IVR system determines whether the variables are in the desired states and, if not, utilizes the fulfillment type information in the data objects to attempt to put the variables in the desired states, allowing the call flow to proceed. This dynamic resolution process provides a mechanism for resolving the values of variables in data objects as the values are required, eliminates the chance that a "variable-reliant" component will precede the determination of that variable, and eases the burden on the call flow developer.

Figure 1:
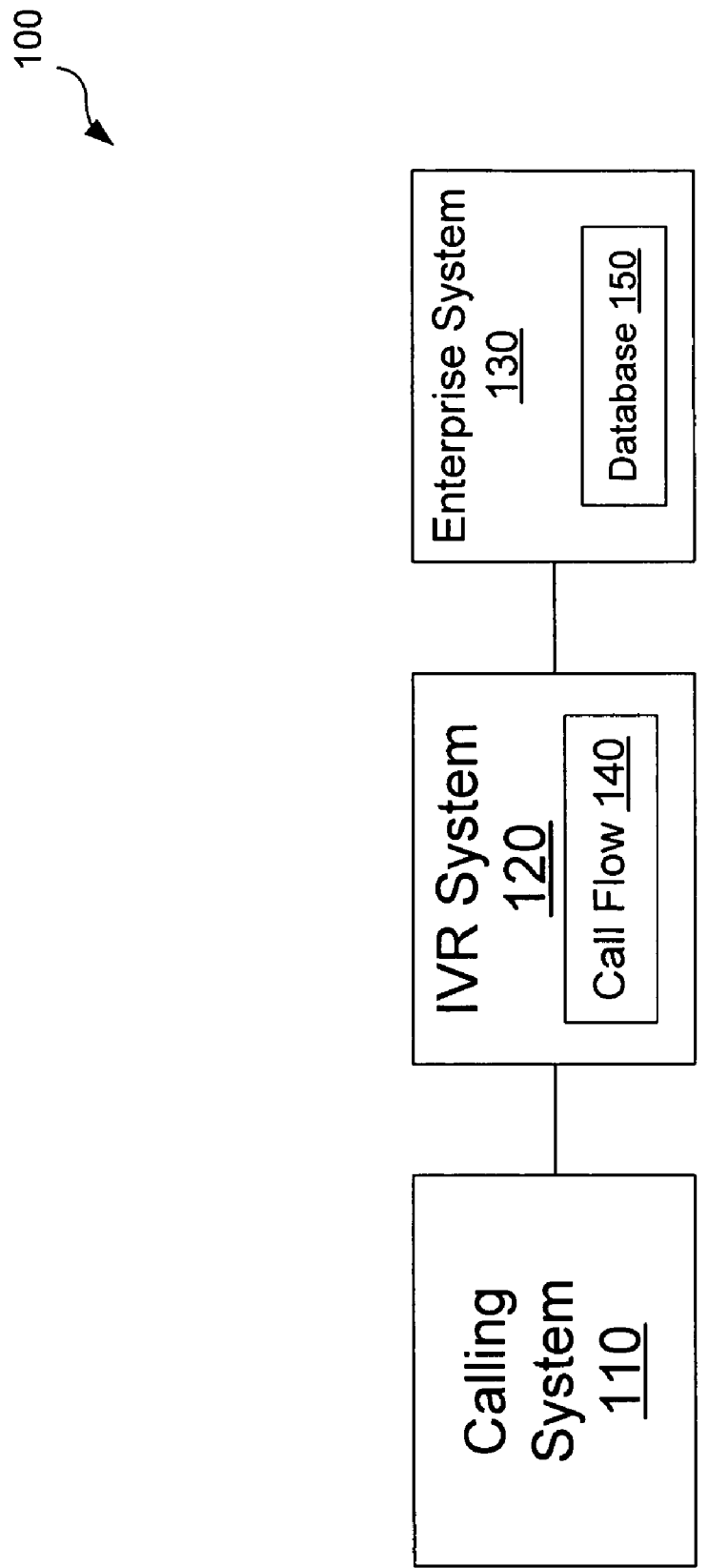
FIG. 1 illustrates a block diagram of an environment in which an interactive voice response (IVR) system can be used.

The figures depict one embodiment of the present invention for purposes of illustration only. One skilled in the art will readily recognize from the following discussion that alternative embodiments of the structures and methods illustrated herein can be employed without departing from the principles of the invention described herein.

DETAILED DESCRIPTION OF THE PREFERRED EMBODIMENTS

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to an apparatus for performing the operations herein. This apparatus is specially constructed for the required purposes, or it comprises a general-purpose computer selectively activated or reconfigured by a computer program stored in the computer. Such a computer program is stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems are used with programs in accordance with the teachings herein, or more specialized apparatus are constructed to perform the required method steps. The required structure for a variety of these systems will appear from the description below. In addition, the present invention is not described with reference to any particular programming language. It will be appreciated that a variety of programming languages can be used to implement the teachings of the invention as described herein.

FIG. 1 illustrates a block diagram of an environment in which an interactive voice response (IVR) system can be used. In the illustrated embodiment, the environment 100 includes a calling system 110, an IVR system 120, and an enterprise system 130. The calling system 110 is used by a caller to interact with the IVR system 120. In general, the calling system 110 provides an interface allowing a caller to provide information to, and receive information from, the IVR system 120. For example, the caller can provide information to the IVR system 120 through spoken words captured by a microphone on the calling system 110, by pressing buttons on a keypad that the calling system translates into dual tone multi-frequency (DTMF) signals and/or digital data, etc. Likewise, the calling system 110 can present information to the caller by playing sounds through a speaker, presenting text or images on a display, etc. In one embodiment, the calling system 110 is a telephone. In other embodiments the calling system 110 is a computer system, portable digital assistant, portable email device, and/or another electronic device that supports interaction with the IVR system 120.

The IVR system 120 enables a caller to perform a task. In one embodiment, the IVR system 120 is utilized to facilitate interactions with a bank, such as checking an account balance or transferring funds. Therefore, this description includes numerous examples and descriptions where the caller uses the IVR system 120 to perform banking transactions. Those of skill in the art will recognize, however, that the IVR system 120 can be utilized for tasks other than banking. In one embodiment, the IVR system 120 includes a general purpose computer system that contains hardware for interfacing with a telephone network or other data transmission network utilized to communicate with the calling system 110. The computer system 120 executes software providing IVR functionality as described below.

The enterprise system 130 illustrated in FIG. 1 is representative of a computer system utilized by a bank or other entity to maintain information that can be retrieved and/or manipulated by the caller through the IVR system 120. For example, the enterprise system 130 can represent a computer system that stores bank accounts in a database 150. The caller can thus use the IVR system 120 to access the bank's enterprise system 130 and manipulate the caller's bank account.

In one embodiment, the IVR system 120 utilizes a call flow 140 to control its interactions with the calling system 110 and/or enterprise system 130. The call flow 140 is typically produced by a human developer and is customized to provide the functions desired by the callers to, and/or operators of, the enterprise system 130. For example, a developer of a call flow for a bank will design the call flow to provide callers with access to the features that the bank desires to provide to the callers.

In order to ease call flow development, the steps and/or processes in the call flow 140 are divided into functional units called "objects." Each object holds a discrete set of data, performs a discrete task, and/or collection of discrete tasks. A developer links certain types of the various objects to form a directed graph that defines the call flow 140. The use of objects in this manner allows relatively easy creation, manipulation, and visualization of the call flow 140.

In one embodiment, the call flow 140 can include "process objects" (POs) Each PO performs one or more steps, such as providing a message to the calling system 110. The POs can contain aggregations of steps that perform higher-level tasks, such as authenticating a caller or performing a funds transfer. Likewise, POs can be formed from groups of other POs.

In one embodiment, there are at least two types of POs: feature and general. Feature POs are typically application-specific. For example, in the banking environment the feature POs can perform banking tasks such as determining account balances and transferring funds. General POs include functionality for performing tasks that are useful for multiple IVR applications, such as switching and routing phone calls and interacting with the caller. For example, general POs can perform tasks such as answering and disconnecting the calling system 110, transferring the calling system to another system, presenting a menu to the caller, receiving input from the caller, etc. POs are further discussed in Appendix A.

In one embodiment, a PO contains self-describing information that can be utilized by the other POs to reference the PO. For example, a feature PO for transferring funds can contain data describing its function as "transfer funds." The self-describing information eases application development because it allows the PO to be included in a dynamic menu that is generated at run-time. For example, assume that the call flow 140 presents a menu of choices to a caller. This task is performed by a Menu PO that presents a menu to a caller, obtains the caller's input, and routes the call flow accordingly. The menu can say "Press '1' for account balance or press '2' to transfer funds." In this case, the Menu PO can determine the number to press, e.g. "2," based on the number of options being offered to the caller, and can determine the activity corresponding to that number, e.g., "transfer funds," by retrieving the self-identifying information from the PO corresponding to that menu choice. This technology allows the call flow 140 to generate menus on the fly. For example, if a dynamic aspect of the call flow 140 requires a menu option to be inserted between "account balance" and "transfer funds," the Menu PO can renumber the menu items at run time and associate the self-describing text of the feature PO for transferring funds with its new menu position. In addition, this technology allows a developer to more easily build menus at development time because the developer does not need to hardcode menu options and associated descriptions.

In one embodiment, the call flow 140 includes application objects (AOs). An Application Object (AO) includes computer code that performs a particular function. For example, an AO can include Voice eXtensible Markup Language (VoiceXML) or Speech Application Language Tag (SALT) instructions for performing specific tasks using the IVR system 120. Similarly, the AO can include code for interacting with the enterprise system 130 and/or database 150. In one embodiment, a PO can utilize an AO to perform a specific task. The AOs abstract the low-level implementation code away from the POs, and thus ease development of the call flow 140.

POs and AOs utilize one or more variables in order to perform their tasks. The variables store items of information such as inputs received from callers and values retrieved from the database 150. A PO can specify a set of variables that are utilized by the PO. The PO can specify that certain ones of these variables must be resolved (e.g., have values in a certain state) before the PO can be executed. These variables are referred to as "preconditions" of the PO. Correspondingly, an AO can specify a set of input variables that will be utilized by the AO during its execution and these input variables must be resolved before the AO is executed.

Figure 2:
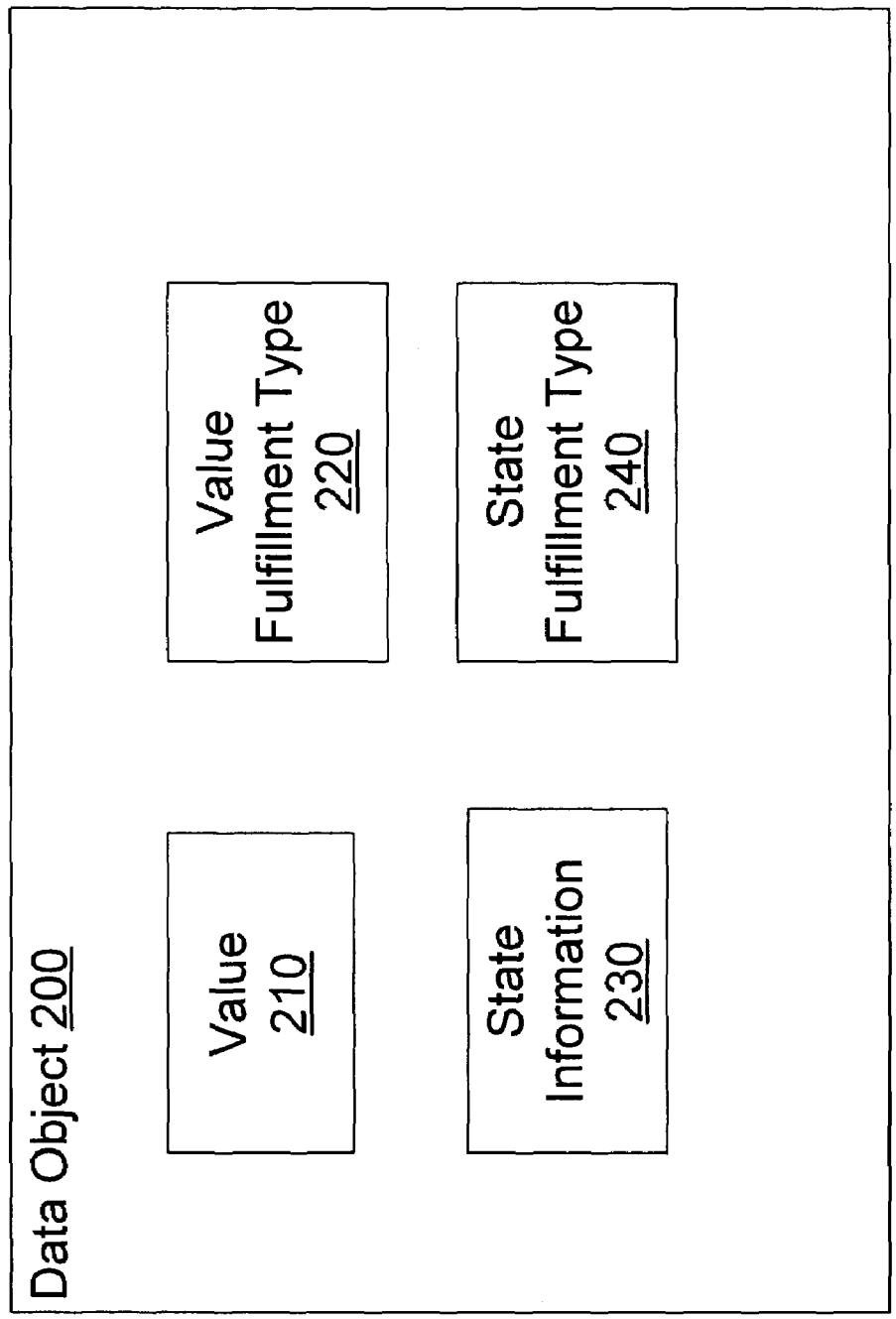
FIG. 2 is a block diagram illustrating a data object according to one embodiment.

In one embodiment, a variable utilized by the call flow 140 is bound into a data object along with other information that describes the variable. FIG. 2 is a block diagram illustrating a data object 200 according to one embodiment. In general, a data object 200 stores at least one variable 210 having a value that can be read and manipulated by the POs and/or AOs. For example, the variable 210 can store the number called by the calling system 110, the menu selection made by a caller, the number of the caller's savings account, etc.

In one embodiment, a data object 200 also stores value fulfillment type information 220 that describes how to fulfill (i.e., get or determine) the value of the variable 210. There are multiple ways to fulfill the value of a variable 210. In one embodiment, the value is fulfilled through an interaction with the caller. For example, the value of a variable representing a menu selection option made by a caller can be obtained by presenting the caller with a menu and capturing the caller's response. In another example, the value of the variable can be fulfilled by prompting the user to provide a freeform input, such as asking the caller to say his or her name and then storing the caller's response in the variable. In one embodiment, the value of the variable 210 is fulfilled through a non-interactive process. For example, the value of the variable 210 can be fulfilled through accessing information stored in the enterprise system 130 or database 150, through calculating the variable based on one or more other variables used by the call flow 140, by using a default value, etc.

In one embodiment, the value fulfillment type information 220 for a data object 200 also stores value fulfillment error handling instructions. The error handling instructions describe how to react if the fulfillment type fails. In one embodiment, the error handling instructions specify a number of times to retry the fulfillment, such as re-prompting the caller to elicit the desired-information. The error handling instructions can also specify words to speak to the caller and/or where in the call flow 140 to proceed next should the fulfillment fail. In another embodiment, the error handling instructions can specify to use another value fulfillment type or perform other actions.

A data object 200 also stores state information 230 describing the state of the variable 210. In one embodiment, the data object 200 also stores state fulfillment type information 240 describing how to change the state of the variable 210. The state information 230 includes information about whether the value of a variable 210 has been set. In one embodiment, this state information is represented by a status code. The state fulfillment type information 240 can indicate that the status code should be set to a particular state when a PO assigns a value to the variable 210 and set to another state when a PO invalidates the value.

In one embodiment, the state information 230 includes confirmation information indicating whether the value of the variable 210 has been confirmed as accurate. The confirmation information can be represented by setting the status code to a particular state that indicates whether the value of the variable is confirmed. There are multiple ways to confirm the value of the variable 210, and the state fulfillment type information 240 can indicate that one or more of these ways should be performed. Perhaps the most common way to confirm a value is to present the value to the caller and ask the caller to say whether the value is accurate. Another way to confirm a value is to assume that the value is confirmed unless the caller indicates to the contrary.

In one embodiment, the state information 230 includes validation information indicating whether the value of the variable is valid (i.e., whether the value has been validated). The validation information can be represented by setting the status code to a particular state that indicates whether the value of the variable is valid. In general, a value is "valid" when it conforms to an expected set of parameters. For example, a US ZIP code is expected to have at least five digits. Similarly, a credit card number is expected to have a certain prefix and number of digits, and to satisfy a check digit algorithm. The state fulfillment type information 240 for the validation information indicates how to determine whether the value satisfies the set of parameters. For example, the state fulfillment type information 240 can indicate that the status code should be in a particular state if the value satisfies a credit card number checking routine.

As described above, a data object 200 in one embodiment includes all of the information needed to use the object in a call flow. The object contains the value of the variable 210, information 230 describing the state of the variable, and information 220, 240 describing how to fulfill the value and state information. In one embodiment, the information within the data object 200 also includes how to vocalize the data object's value, what value(s), if any, the data object should have initially, and which other data objects, if any, should have their statuses reset when the data object has its value set. Because the data object 200 is self contained, it can be used in recursive and other types of procedures in the call flow 140 without creating undue complexity or risking that the call flow will "break." Such uses are described below.

Figure 3:
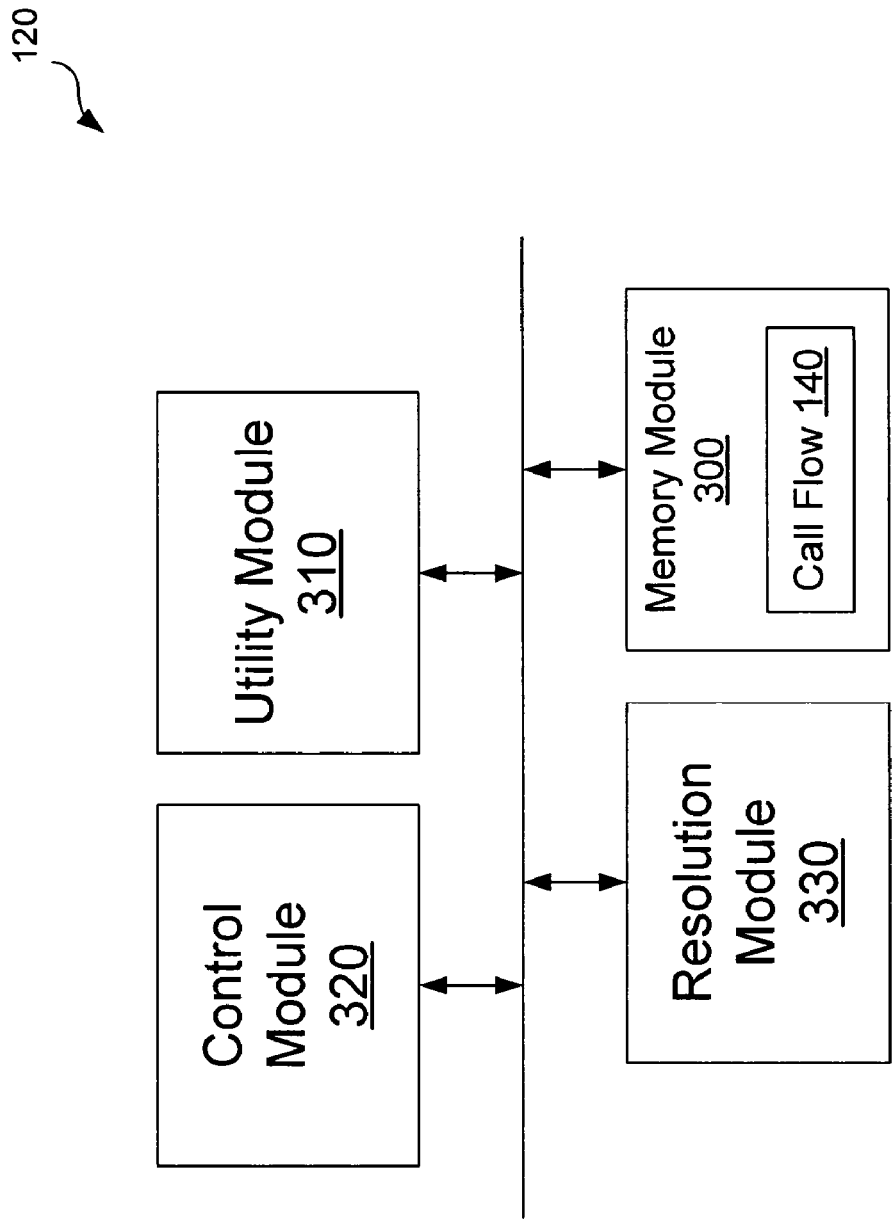
FIG. 3 is a high-level view of a block diagram of modules within the IVR system of FIG. 1.

FIG. 3 is a high-level view of a block diagram of modules within the IVR system 120 of FIG. 1. As used herein, the term "module" refers to computer program logic for providing the specified functionality. A module can be implemented in hardware, firmware, and/or software. In one embodiment, the modules within the IVR system 120 are software modules that are loaded into a memory and executed by a processor on the IVR system 120. Those of skill in the art will understand that other embodiments of the IVR system 120 can have different and/or other modules than the ones described herein. In addition, the functionalities can be distributed among the modules in a manner different than described herein.

In the illustrated embodiment, the IVR system 120 includes a memory module 300, a utility module 310, a control module 320, and a resolution module 330. The memory module 300 stores the call flow 140 and information utilized to process the call flow, such data objects 200. The utility module 310 performs utility functions, such as interfacing with the memory module 300, input/output devices (not shown), and other computer systems (e.g., enterprise system 130). For example, the utility module 310 can receive a file from enterprise system 130 and load it into the memory module 300. In one embodiment, the utility module 310 interfaces with the calling system 110 through telephony devices, such as switches and routers. In this way, the utility module 310 can receive input from, and provide output to, the caller.

The control module 320 controls the operation and process flow of the IVR system 120, transmitting instructions and data to as well as receiving data from the other modules. The operation of the control module 320 is determined in part by the call flow 140 and caller input. In particular, the control module 320 executes POs and/or AOs in the call flow 140.

During the execution of the call flow, the control module 320 will occasionally encounter conditions where a PO and/or AO requires a data object 200 to be in a certain state, but the data object is not in that state. Consider, for example, the situation where a PO has an explicit precondition that specifies that the value of a particular data object must be set before the PO can execute, but the value is not set and/or confirmed when the call flow 140 reaches that PO. Likewise, an AO can require the value of a data object 200 as an input, but the value has yet not been set. In another example, the control module 320 can be executing the steps within a PO and encounter a condition where it requires a data object that is not in the correct state. This latter situation can occur when the call flow directs the IVR system 120 to play a message such as "Your account balance is [balance_of_account]" but the variable balance_of_account has not been set.

When the control module 320 requires a data object 200 to be in a certain state, but it is not in that state, the control module 320 utilizes the resolution module 330. The resolution module 330 resolves the data object 200 by using the value 220 and/or state 240 fulfillment type information to place the data object in the desired state. In a typical case, the control module 320 will require the variable 210 in the data object to be set and confirmed. Upon receiving the data object 200 (e.g., a reference to the data object) and a description of the desired state from the control module 320, the resolution module executes the fulfillment type information 220, 240 to obtain and confirm the value of the variable 210. Then, the resolution module 330 passes the data object 200 back to the control module 320.

The values of variables 210 within data objects 200 may depend upon variables of other data objects. Therefore, a request from the control module 320 to resolve a single data object 200 can cause the resolution module 330 to resolve multiple data objects in the dependency chain for that object. In one embodiment, the resolution module 330 uses recursive processing to resolve each data object 200 required to be resolved in order to respond to the initial request from the control module 320. The data objects 200 are especially adapted to such recursive processing because each object contains its own value 220 and state 240 fulfillment type information and the resolution module 330 can use this information to resolve the object.

Figure 4:
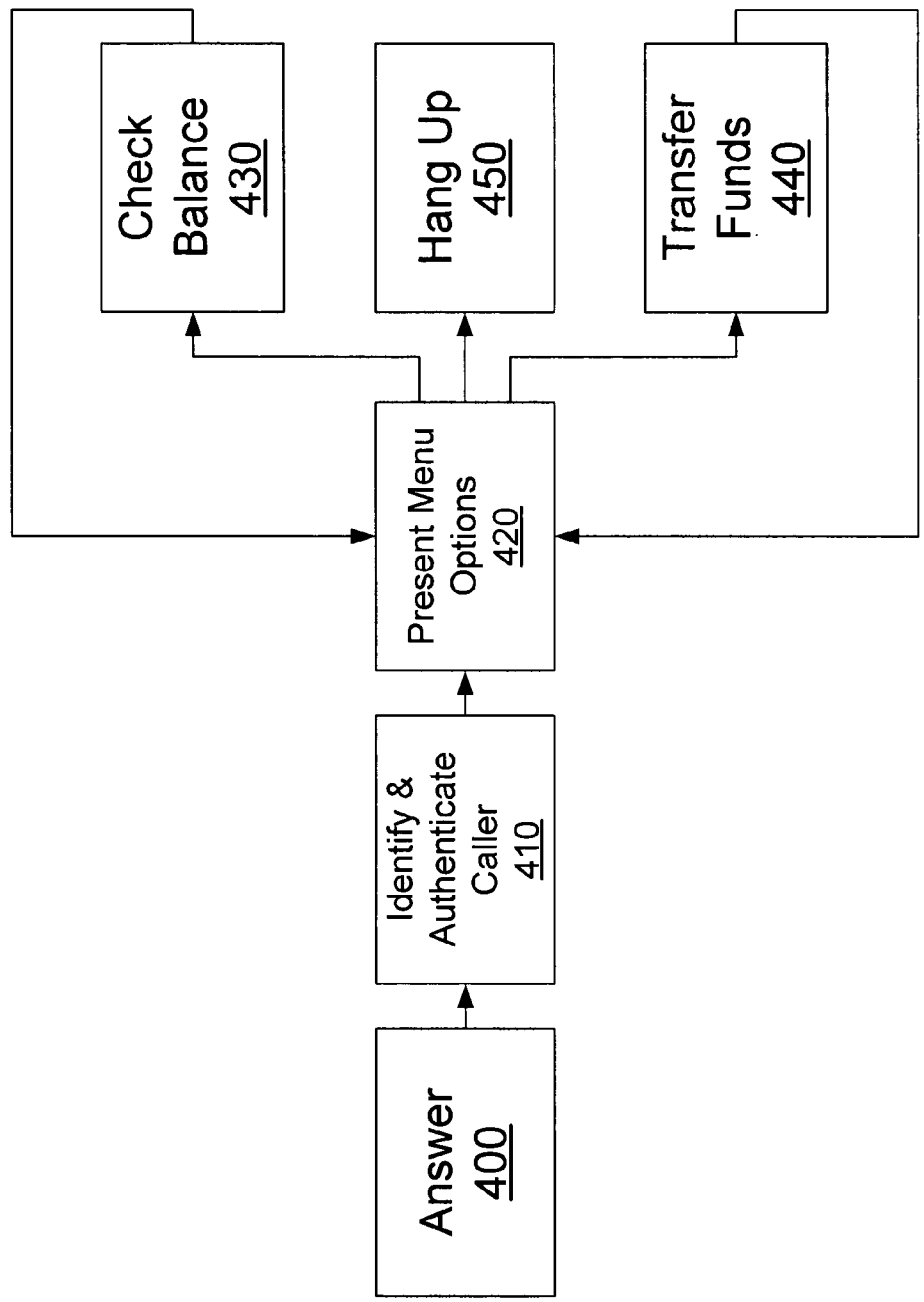
FIG. 4 is a high-level block diagram illustrating an example of a call flow executed by the IVR system.

FIG. 4 is a high-level block diagram illustrating an example of the call flow 140 executed by the IVR system 120. The call flow is illustrated as a sequence of boxes linked in a directed graph. Each box in this example represents a PO, although those of skill in the art will recognize that at least some of the functions can be performed by AOs and/or discrete steps not encapsulated in an object. Those of skill in the art will recognize that embodiments of the IVR system 120 can use call flows different than the one shown, and the functionalities described as part of particular POs and/or AOs can be performed by other POs and/or AOs in other embodiments. Likewise, other embodiments can have different and/or additional steps than those described herein.

The call flow begins with a PO 400 answering the calling system 110. A purpose of this PO 400 is to initiate communications with the caller and transfer control to the appropriate steps of the call flow 110. The answering PO 400 might include, for example, determining the number that the calling system 110 called to reach the IVR system 120, playing a greeting message to the caller, etc.

After the calling system is answered 400, a PO 410 identifies and authenticates the caller. This step can include receiving an account number and password from the caller, and verifying that these values match information about the caller stored in the database 150 of the enterprise system 130. Assume for purposes of this example that the PO 410 performs this identification and authentication by calling an AO that requires the account number and password as inputs and returns a result indicating whether they match. The resolution module 330 recognizes that these two variables are required as inputs to the AO but that the data objects that store these variables have not yet been placed in the appropriate state (e.g., are not set, validated, and confirmed). Thus, the resolution module 330 activates the value 220 and state 240 fulfillment type information in the data objects. To obtain the values of the variables and set the state information.

The call flow 140 next includes a menu PO 420 that presents the caller with a menu of options. In this example, the PO 420 determines the menu dynamically based on the number of accounts held by the caller. If the caller has only one account, the PO 420 presents the caller with two menu choices: "check balance" and "hang up." If the caller has more than one account, the PO presents the caller with an additional menu choice: "transfer funds." The PO has an explicit precondition that requires a variable holding a value indicating the number of accounts to be set before the PO is executed. The resolution module 330 thus activates the appropriate data object's fulfillment type information to set this variable, if it has not been previously set.

Assume that the caller has more than one account. Therefore, the menu PO 420 plays a statement to the caller that says: "Press '1' to check account balance, press '2' to transfer funds and press '3' to hang up." When formulating this statement, the menu PO 420 generates the number to press (e.g., "1") sequentially based on the number of the option and generates the description of the option (e.g., "check account balance") by analyzing the self-identifying information held in the PO that is associated with the menu option.

If the caller selects menu item "1," the call flow 140 proceeds to a check balance PO 430. Given that the caller has multiple accounts, the check balance PO 430 has an explicit precondition that an "account to check" variable must be set so that the PO "knows" for which account to obtain the balance. The resolution module 330 resolves this variable using the fulfillment type information in its data object 200 and the check balance PO 430 is executed.

In a similar fashion, if the caller selects menu item "2," the call flow 140 proceeds to a transfer funds PO 440. This PO 440 needs to know the origin account, the destination account, and the amount of funds to transfer in order to carry out this operation. Likewise, the transfer funds PO 440 may need to perform other tasks, such as verifying that the origin account has enough funds to support the transfer. As is apparent by now, each of these pieces of information can have a corresponding data object 200 with fulfillment type information. The transfer funds PO 440 can have explicit preconditions that specify that the data objects must be in a certain state before the PO is executed. The resolution module 330 resolves the data objects and the PO is then executed.

The hang up PO 450 allows the caller to terminate the IVR session. As with the other POs, it can have preconditions and utilize the other functionalities described above.

In sum, one embodiment of the IVR system 120 makes use of data objects that have variable, fulfillment type, and state information and includes a resolution module 330 that can resolve data objects when necessary or desired. This functionality eases the burden on the call flow developer because it eliminates the possibility that a call flow will be "broken" because it requires information that has not yet been obtained.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

APPENDIX A

Types of Process Objects

This appendix describes process objects according to one embodiment of the IVR system 120.

Feature PO—A Feature PO performs a task requested by a caller and passes control to another PO. This function is generally the fulfillment of the desire that caused the caller to place the call (e.g., the desire to transfer money from one bank account to another). In order for a Feature PO to be successfully processed, the ExecutionPreconditions should be met. If the ExecutionPreconditions have not been met, the PreconditionFailureStatement is played, and NextObject (a PO) will be processed next.

If the ExecutionPreconditions have been met, processing of the Feature PO continues: Data Objects that are used by the FeatureFulfillmentApplicationObject, the confirmation (see below), and the Please WaitStatement are identified and resolved.

The FeatureFulfillmentApplicationObject is then executed, which performs a task requested by a caller (e.g., transferring funds). Confirmation is optionally performed regarding the task. In one embodiment, there are three ways to perform confirmation: outright acceptance, implicit confirmation, and explicit confirmation. In outright acceptance, the caller's input is accepted without further inquiry, and a TransitionStatement (a Statement) is played. In implicit confirmation and explicit confirmation, the caller is requested to confirm her input. For example, a Statement containing the caller's input is played, and the caller is asked to confirm this input. If the caller affirms (i.e., the confirmation is correct), a PostAffirmationStatement (a Statement) is played. If the caller declines (i.e., the confirmation is incorrect), a PostDeclinationStatement (a Statement) is played. If the caller does not respond, that is treated like affirmation in implicit confirmation and like declination in explicit confirmation. In the context of a Feature PO, if the caller affirmed or outright acceptance was used, the Please WaitStatement (a Statement) is played, and the FeatureFulfillmentApplicationObject (an AO) is invoked.

A Statement is played, and NextObject will be processed next. In one embodiment, the Statement and NextObject vary based on the result of the execution of the FeatureFulfillmentApplicationObject. A Data Object whose status information includes "confirmed as incorrect" by the FeatureFulfillmentApplicationObject has its status information changed to include "unset." Data Objects in the PostExecutionDataObjectReset (a set of Data Objects) have their status information changed to include "unset." If the caller declined, invocation of the FeatureFulfillmentApplicationObject is bypassed, and the DeclinationNextObject (a PO) is processed next.

Answer Phone PO—An Answer Phone PO greets a caller and passes control to another PO. An Answer Phone PO is processed as follows: Introductory Statement (a Statement) is played. NextObject (a PO) will be processed next. In one embodiment, a call flow 140 includes exactly one Answer Phone Process Object. In this embodiment, the IVR system 120 processes the Answer Phone Process Object first. The processing order of the remaining POs can be predetermined (for example, by having a PO specify the PO that should be processed next), or it can vary (for example, by receiving caller input in response to a prompt).

Transfer Phone PO—A Transfer Phone PO bids farewell to a caller and transfers the call to a different number. A Transfer Phone PO is processed as follows: IntroductoryStatement (a Statement) is played. TransferPhoneNumber (a Data Object) is resolved. TransferPhoneNumberApplicationObject (an AO) is invoked using the resolved value.

Hang Up Phone PO—A Hang Up Phone PO bids farewell to a caller and terminates the call. A Hang Up Phone PO is processed as follows: IntroductoryStatement (a Statement) is played. PhoneHangUpApplicationObject (an AO) is invoked.

Menu PO—A Menu PO solicits information from a caller and passes control to another PO based on the information received. For example, in a banking transaction, the following prompt might be played: "Press or say '1' for account balance. Press or say '2' for recent transactions." The caller's input determines which PO will be processed next. A Menu PO is processed as follows: For a Data Object in PreExecutionDataObjectReset (a set of Data Objects), its status information is changed to include "unset." In order for a Menu PO to be successfully processed, the ExecutionPreconditions should be met. If the ExecutionPreconditions have not been met, the PreconditionFailureStatement is played, and NextObject will be processed next.

If the ExecutionPreconditions have been met, processing of the Menu PO continues: IntroductoryStatement (a Statement) is analyzed. As discussed above, a Menu PO solicits information from a caller and passes control to another PO based on the information received. Specifically, a Menu PO presents the caller with one or more menu options from which to choose. In order for a menu option to be available, its EntitlementPreconditions should be met. For an available menu option, its OptionStatement (a Statement) is analyzed. A SubsequentStatement (a Statement) is analyzed. If at least one menu option is available, the caller's menu choice is solicited. For example, a DTMF Prompt Player AO or Speech Recognition Prompt Player AO presents a question and the available menu options and receives the caller's input.

Confirmation is optionally performed regarding the caller's selected option. Again, there are three ways to perform confirmation: outright acceptance, implicit confirmation, and explicit confirmation. If the caller affirms (i.e., the confirmation is correct) or outright acceptance is used, a particular value can be assigned to a Data Object based on the menu option chosen. This value can then subsequently affect the call flow. Data Objects in the PostExecutionDataObjectReset (a set of Data Objects) have their status information changed to include "unset."

Speech Recognition PO—A Speech Recognition PO solicits information from a caller and, based on the information received, determines a PO to process next or determines a Data Object's value. A Speech Recognition PO is processed as follows: For a Data Object in PreExecutionDataObjectReset (a set of Data Objects), its status information is changed to include "unset." In order for a Speech Recognition PO to be successfully processed, its ExecutionPreconditions should be met. If the ExecutionPreconditions have not been met, the PreconditionFailureStatement is played, and NextObject will be processed next.

If the ExecutionPreconditions have been met, processing of the Speech Recognition PO continues: Its PromptStatement (a Statement) is analyzed. The caller's input is solicited. For example, a DTMF Prompt Player AO or Speech Recognition Prompt Player AO presents a question and the available menu options and receives the caller's input. The caller's input is used to determine a PO to process next or a Data Object's value.

If the caller's input was used to determine a PO, the PO's EntitlementPreconditions should be met. If the EntitlementPreconditions have not been met, the EntitlementFailureStatement is played, and the caller's input is again solicited. If the EntitlementPreconditions have been met, the PO is processed, and Data Objects in the PostExecutionDataObjectReset (a set of Data Objects) have their status information changed to include "unset."

If the caller's input was used to determine a Data Object's value, the Data Object's status information is changed to include "set," "not yet validated," and "not confirmed." The next step varies according to the Data Object's fulfillment type (e.g., variable menu, fixed menu, or freeform input). If the fulfillment type is variable menu or fixed menu, the determined value is compared to the menu options. If the determined value matches no options, the value and status information of the Data Object are returned to their previous states. (Otherwise, processing of the Speech Recognition PO continues.) If the type is freeform input, a Data Validation AO is executed to determine validity. If the value is invalid, the value and status information of the Data Object are returned to their previous states. (Otherwise, processing of the Speech Recognition PO continues.)

Confirmation is optionally performed regarding the value determined by the caller's input. Again, there are three ways to perform confirmation: outright acceptance, implicit confirmation, and explicit confirmation. If the caller affirms (i.e., the confirmation is correct) or outright acceptance is used, a PostAffirmationStatement (a Statement) is played, and the validity status is changed to "set." If the caller declines (i.e., the confirmation is incorrect), a PostDeclinationStatement (a Statement) is played, the value and status information of the Data Object are returned to their previous states, and the caller's input is again solicited.

Alternative Embodiments

In another embodiment, a PO has a step entitled NonFulfillmentProcessing. If an error occurs while processing a PO, the PO's NonFulfillmentProcessing is executed. This execution can include, for example, playing a NonFulfillmentStatement and/or determining that the PO's NonFulfillmentNextObject should be processed next. In one embodiment, when a Speech Recognition PO was being processed, execution of NonFulfillmentProcessing can include returning the values and status information of Data Objects that were changed. In one embodiment, a call flow has a step entitled FatalStatement (a Statement). If an error occurs while performing NonFulfillmentProcessing of a Process Object, then the call flow's FatalStatement is played and the call is terminated.

We claim:

1. An interactive voice response (IVR) system for executing a call flow, comprising:
    a memory module for holding a data object, the data object including at least one variable utilized during processing of the call flow, state information describing a state of the variable, and fulfillment type information describing how to alter the state of the variable;
    a control module for executing an object for performing a task associated with the call flows the object for performing a task specifying a desired state of the variable in the data object; and
    a resolution module for utilizing the fulfillment type information in the data object to place the variable in the desired state if necessary.

2. The IVR system of claim 1, wherein the data object includes value fulfillment type information describing how to obtain a value for the variable.

3. The IVR system of claim 1, wherein the data object includes state fulfillment type information describing how to place the variable in a specified state.

4. The IVR system of claim 3, wherein the specified state is one or more states selected from the group consisting of:
    a set/unset state describing whether the variable has a value;
    a confirmed/not confirmed state describing whether the value of the variable has been confirmed; and
    a validated/not validated state describing whether the value of the variable satisfies an expected set of parameters.

5. The IVR system of claim 1, wherein the object for performing a task associated with the call flow specifies a set of execution preconditions, the preconditions describing a state the variable must be in before the object for performing a task is executed.

6. The IVR system of claim 1, wherein the object for performing a task associated with the call flow plays a statement to a caller to the IVR system, the statement including a portion determined responsive to a value of the variable, wherein the resolution module is adapted to utilize the fulfillment type information to determine the value of the variable contemporaneously with the playing of the statement.

7. The IVR system of claim 1, wherein the object for performing a task associated with the call flow receives a value of the variable as an input, wherein the resolution module is adapted to utilize the fulfillment type information to determine the value of the variable.

8. The IVR system of claim 1, wherein the object for performing a task associated with the call flow includes self-identifying information that is utilized to provide a caller to the IVR system with a description of the task.

9. A computer program product having a computer-readable medium having computer program instructions encoded therein for executing a call flow in an interactive voice response (IVR) system, comprising:
   a memory module for holding a data object, the data object including at least one variable utilized during processing of the call flow, state information describing a state of the variable, and fulfillment type information describing how to alter the state of the variable;
   a control module for executing an object for performing a task associated with the call flow, the object for performing a task specifying a desired state of the variable in the data object; and
   a resolution module for utilizing the fulfillment type information in the data object to place the variable in the desired state if necessary.

10. The computer program product of claim 9, wherein the data object includes value fulfillment type information describing how to obtain a value for the variable.

11. The computer program product of claim 9, wherein the data object includes state fulfillment type information describing how to place the variable in a specified state.

12. The computer program product of claim 11, wherein the specified state is one or more states selected from the group consisting of:
   a set/unset state describing whether the variable has a value;
   a confirmed/not confirmed state describing whether the value of the variable has been confirmed; and
   a validated/not validated state describing whether the value of the variable satisfies an expected set of parameters.

13. The computer program product of claim 9, wherein the object for performing a task associated with the call flow specifies a set of execution preconditions, the preconditions describing a state the variable must be in before the object for performing a task is executed.

14. The computer program product of claim 9, wherein the object for performing a task associated with the call flow plays a statement to a caller to the IVR system, the statement including a portion determined responsive to a value of the variable, wherein the resolution module is adapted to utilize the fulfillment type information to determine the value of the variable contemporaneously with the playing of the statement.

15. The computer program product of claim 9, wherein the object for performing a task associated with the call flow receives a value of the variable as an input, wherein the resolution module is adapted to utilize the fulfillment type information to determine the value of the variable.

16. The computer program product of claim 9, wherein the object for performing a task associated with the call flow includes self-identifying information that is utilized to provide a caller to the IVR system with a description of the task.

17. A method for executing a call flow in an interactive voice response (IVR) system, comprising:
   defining a data object, the data object including at least one variable utilized during processing of the call flow, state information describing a state of the variable, and fulfillment type information describing how to alter the state of the variable;
   identifying a desired state of the variable in the data object as specified by an object for performing a task associated with the call flow; and
   determining whether the state information indicates that the variable is in the desired state and, if the variable is not in the desired state, utilizing the fulfillment type information in the data object to place the variable in the desired state.

18. The method of claim 17, wherein the data object includes value fulfillment type information describing how to obtain a value for the variable.

19. The method of claim 17, wherein the data object includes state fulfillment type information describing how to place the variable in a specified state.

20. The method of claim 19, wherein the specified state is one or more states selected from the group consisting of:
   a set/unset state describing whether the variable has a value;
   a confirmed/not confirmed state describing whether the value of the variable has been confirmed; and
   a validated/not validated state describing whether the value of the variable satisfies an expected set of parameters.

21. The method of claim 17, wherein the object for performing a task associated with the call flow specifies a set of execution preconditions, the preconditions describing a state the variable must be in before the object for performing a task is executed.

22. The method of claim 17, wherein the object for performing a task associated with the call flow plays a statement to a caller to the IVR system, the statement including a portion determined responsive to a value of the variable, wherein the resolution module is adapted to utilize the fulfillment type information to determine the value of the variable contemporaneously with the playing of the statement.

23. The method of claim 17, wherein the object for performing a task associated with the call flow receives a value of the variable as an input, wherein the resolution module is adapted to utilize the fulfillment type information to determine the value of the variable.

24. The method of claim 17, wherein the object for performing a task associated with the call flow includes self-identifying information that is utilized to provide a caller to the IVR system with a description of the task.

* * * * *